3,340,263
AMINO-PYRROLES

Alexander Staehelin, Reinach, Basel-Land, Karl Schenker, Basel, and Arnoldo Rossi Pietro, Oberwil, Basel-Land, Switzerland, assignors to Ciba Corporation, New York, N.Y., a corporation of Delaware
No Drawing. Filed Feb. 1, 1965, Ser. No. 429,653
Claims priority, application Switzerland, Feb. 14, 1964, 1,795/64; Dec. 14, 1964, 16,109/64
23 Claims. (Cl. 260—268)

The present invention relates to new pyrrole derivatives. Especially it concerns 3-aminoalkylamino-4-aryl-pyrroline-2,5-diones and their salts.

The aryl radical in position 4 of the new compounds is above all a phenyl radical; it may be unsubstituted or mono- or polysubstituted, preferably by lower alkyl radicals, lower alkoxy residues, halogen atoms or trifluoromethyl groups.

Lower alkyl radicals are especially methyl, ethyl, propyl or isopropyl residues, or straight or branched butyl, pentyl or hexyl residues bound in any desired position. Lower alkoxy radicals are, for example, methoxy, ethoxy or corresponding propoxy, butoxy or pentyloxy groups. As examples of suitable halogen atoms there may be mentioned fluorine, chlorine or bromine atoms.

The alkylene group, which is the aminoalkylamino group links the terminal amino group with the nitrogen atom attached to the pyrroline ring is, above all, a straight or branched lower alkylene residue containing 2 to 5 carbon atoms which separates the terminal amino group from the nitrogen atom attached to the pyrroline ring by at least 2 carbon atoms, such as an ethylene residue or straight or branched propylene, butylene or pentylene residue.

The nitrogen atom of the aminoalkylamino group attached to the pyrroline ring may be substituted, more especially by a lower alkyl radical, for example one of those mentioned above, or above all by a phenyl-lower alkyl radical, which may be substituted in the aromatic nucleus by lower alkyl or alkoxy groups, halogen atoms and/or trifluoromethyl groups, for example by a benzyl or phenylethyl group.

The terminal amino group of the aminoalkylamino group is preferably a tertiary amino group. This amino group may be substituted, above all, by lower aliphatic hydrocarbon residues, which may be interrupted in the carbon chain by hetero atoms such as oxygen, nitrogen or sulfur, or they may be linked with the alkylene residue or a possible substituent of the nitrogen atom of the aminoalkylamino group attached to the pyrroline ring and/or they may be substituted by hydroxyl groups.

Lower aliphatic hydrocarbon residues are, above all, saturated or mono-unsaturated alkyl or alkenyl radicals containing up to 8 carbon atoms or alkylene radicals containing 4 to 8 carbon atoms. Residues of this type interrupted by hetero atoms are above all mono-thiaalkylene, mono-oxaalkylene or mono-azaalkylene radicals containing 4 to 7 carbon atoms. There may be mentioned more especially methyl, ethyl-β-hydroxyethyl, allyl, propyl, isopropyl; straight or branched butyl, pentyl, hexyl or heptyl residues linked in any desired position; butylene-(1,4), butylene-(1,5), hexylene-(1,5), hexylene-(1,6), hexylene-(2,5), heptylene-(1,7), heptylene-(2,7), heptylene-(2,6), 3-oxa or 3-azapentylene-(1,5), 3-oxa- or 3-azahexylene-(1,6), N-alkyl-3-azapentylene-(1,5), such as N-methyl-3-azapentylene-(1,5), N-hydroxyalkyl-3-azapentylene-(1,5), such as N-(β-hydroxyethyl)-3-azapentylene-(1,5).

The tertiary amino groups are above all di-lower alkyl-amino groups such as dimethylamino, diethylamino or dibutylamino groups or pyrrolidino, piperidino, morpholino, thiamorpholino or piperazino groups such as N-lower alkyl-piperazino or N-(hydroxy-lower alkyl)-piperazino groups, for example the N-methyl-piperazino group or the N-(β-hydroxyethyl)-piperazino group.

Aminoalkylamino residues in which a substituent of the terminal amino group is linked with the alkylene residue are, for example, N-(lower alkyl)-pyrrolidinyl-lower alkylamino residues or N-(lower alkyl)-piperidyl-lower alkylamino residues. Aminoalkylamino residues in which a substituent of the terminal amino group is linked with the nitrogen atom of the aminoalkylamino group attached to the pyrroline ring are, for example, aza-alkyleneimino radicals, e.g. piperazino residues such as N-lower alkyl- or alkenylpiperazino residues, for example an N-methyl-, N-ethyl- or N-allyl-piperazino residue, or N-(hydroxy-lower alkyl)-piperazino residues such as the N-(β-hydroxyethyl)-piperazino residue.

The new compounds may contain further substituents, more especially in position 1; as such substituents there are particularly suitable lower alkyl radicals, for example those mentioned above.

The new compounds possess valuable pharmacological properties, above all an antiphlogistic effect. They may be used as antiphlogistics, for example in treating inflammatory processes. They are also valuable intermediates, for example for the manufacture of pharmacologically active substances.

Special mention deserve the compounds of the formula

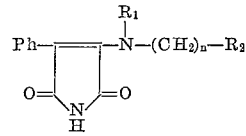

where Ph represents a phenyl radical which may be unsubstituted or substituted by lower alkyl radicals, lower alkoxy groups, halogen atoms and/or trifluoromethyl groups; $R_1$ represents a hydrogen atom, a lower alkyl or above all a phenyl-lower alkyl residue whose aromatic nucleus may be substituted by lower alkyl or lower alkoxy groups, halogen atoms and/or trifluoromethyl, being above all a benzyl radical which may be substituted as indicated, and $R_2$ represents a di-lower alkylamino group, a pyrrolidino, piperidino, morpholino, thiamorpholino or piperazino group such as an N-lower alkyl- or N-hydroxy-lower alkyl-piperazino group, and $n$ stands for 2, 3 or 4, especially 2 or 3, as well as the compounds of the formula

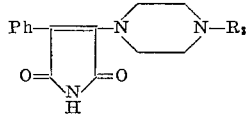

where Ph has the above meaning and $R_3$ represents a lower alkyl or hydroxyalkyl radical.

Especially valuable are the following compounds: 3-[benzyl - (2 - dimethylaminoethyl) - amino] - 4 - phenyl-pyrroline - 2,5 - dione, 3 - [benzyl - (2 - dimethylaminoethyl) - amino] - 4 - meta - methoxyphenyl) - pyrroline-2,5 - dione, 3 - [(2 - diethylaminoethyl) - amino] - 4 - phenyl - pyrroline - 2,5 - dione, 3 - [benzyl - (2 - diethylaminoethyl) - amino] - 4 - phenyl - pyrroline - 2,5 - dione and above all 3-[benzyl-(2-dimethylaminoethyl)-amino] - 4 - (para - chlorophenyl) - pyrroline - 2,5 - dione.

The new compounds are manufactured by known methods, preferably, a 4-aryl-pyrroline-2,5-dione that contains in 3-position a halogen atom, for example a chlorine atom, is reacted with an aminoalkylamine.

The reaction is performed in the usual manner.

In resulting compounds further substituents to suit the desired final products may be introduced by known methods. Thus, for example, a compound which is unsubstituted in position 1 can be alkylated in the known manner, for example by reaction with a reactive ester of a lower alkanol.

A reactive esterified hydroxyl group is, for example, a hydroxyl group esterified with a strong organic or inorganic acid, for example a halogen atom such as chlorine or bromine, or an arylsulfonyloxy group, such as the paratoluenesulfonyloxy group.

The reaction is carried out in the usual manner, preferably using a salt of the 1-unsubstituted pyrroline-dione as starting material, for example, a metal salt, such as an alkali metal salt, for example the sodium or potassium salt; or the reaction is carried out in the presence of a condensing agent forming such a salt, such as sodium hydride.

Depending on the reaction conditions and starting materials used, the final products are obtained in the free form or in the form of their salts which are likewise included in the present invention. The salts of the final products can be converted into the free bases in the known manner, for example with alkalies or ion exchange resins. When the free bases are reacted with organic or inorganic acids, more especially acids that are suitable for forming therapeutically acceptable salts, they give rise to salts; as such acids there may be mentioned, for example, hydrohalic, sulfuric, phosphoric acids, nitric or perchloric acid; aliphatic, alicyclic, aromatic or heterocyclic carboxylic or sulfonic acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicyclic or para-aminosalicyclic acid, embonic, methane-sulfonic, ethanesulfonic, hydroxyethane-sulfonic, ethylenesulfonic acid; halobenzenesulfonic, toluenesulfonic, naphthalenesulfonic acids or sulfanilic acid; methionine, tryptophan, lysine or arginine.

The above mentioned and other salts of the new compounds, for example the picrates, may also be used for purifying the free bases obtained, by converting the latter into salts, isolating the salts and liberating the free bases from the salts. In view of the close relationship between the new compounds in the free form and in the form of their salts, whatever has been said above or hereinafter with reference to the free bases refers, where possible and suitable, also to the corresponding salts.

The invention further includes any modification of the present process in which an intermediate obtainable at any stage of the process is used as starting material and any remaining step/steps is/are carried out, or in which the starting materials are formed under the reaction conditions or are used in the form of their salts.

The reactions of the invention are preferably performed with those starting materials which give rise to the preferred final products mentioned above.

The starting materials can be manufactured by known methods.

The 4-aryl-3-halogeno-pyrroline-2,5-diones used as starting material, such as the 4-aryl-3-chloro-pyrroline-2,5-diones, are new and likewise form an object of the invention. They are obtained, for example, by reacting a 4-aryl-3-hydroxy-pyrroline-2,5-dione with a halogenating agent, such as a phosphorus halide, for example phosphorus oxychloride, phosphorus pentachloride or phosphorus tribromide. The reaction is carried out in the usual manner, preferably in the presence of a tertiary base, such as trimethylamine or above all dimethylaniline.

The 3-hydroxy-4-aryl-pyrroline-2,5-diones can be prepared by condensing an arylacetonitrile with an oxalic acid diester in the presence of a strong base, such as an alkali metal alcoholate, and cyclising the resulting β-aryl-β-cyano-oxo-propionic acid ester in the presence of an acid, for example a strong inorganic acid such as a hydrohalic acid, to form the 3-hydroxy-4-aryl-pyrroline-2,5-dione. The 3-hydroxy-4-aryl-pyrroline-2,5-diones which are substituted in the aryl residue are still new and likewise form an object of the invention.

The afore-mentioned reactions are carried out in the usual manner, preferably in the presence of a solvent and/or diluent, at room temperature or with cooling or heating, under atmospheric or superatmospheric pressure.

The new compounds may be used, for example, in the form of pharmaceutical preparations containing them in the free form or in the form of their salts in conjunction or admixture with organic or inorganic solid or liquid pharmaceutical excipients suitable for parenteral or local administration. Suitable excipients are substances that do not react with the new compounds, for example water, gelatin, lactose, starches, stearyl alcohol, magnesium stearate, talcum, vegetable oils, benzyl alcohols, gums, propylene-glycols, white petroleum jelly or other known medicinal excipients. The pharmaceutical preparations may be, for example tablets, dragees, capsules, ointments or creams, or in liquid form solutions, suspensions or emulsions. They may be sterilised and/or contain assistants such as preserving, stabilising, wetting or emulsifying agents, solution promoters, salts for regulating the osmotic pressure or buffers. They may also contain other therapeutically valuable substances. The pharmaceutical preparations are formulated by known methods.

The new compounds may also be used in the form of animal feeding stuffs or as additives to animal feeding stuffs, with the use, for example, of the conventional extenders and diluents, or feeding stuffs respectively.

The following examples illustrate the invention.

EXAMPLE 1

10 g. of 3-chloro-4-phenyl-pyrroline-2,5-dione in 100 ml. of benzene are heated to the boil, and a mixture of 4.8 g. of N-methylpiperazine and 4.8 g. of triethylamine in 30 ml. of benzene is dropped in. The solution is at first clear and turns gradually dark, and a product crystallises out slowly. After refluxing for 4 hours the mixture is cooled, the crystallisate is suctioned off and washed with benzene and with water, to yield 3-(4-methylpiperazino)-4-phenyl-pyrroline-2,5-dione of the formula

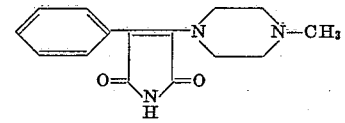

which after recrystallisation from 80% alcohol melts at 209–210° C.

The 3-chloro-4-phenyl-pyrroline-2,5-dione used as starting material can be prepared thus:

150 g. of 3-hydroxy-4-phenyl-pyrroline-2,5-dione and 600 ml. of phosphorus oxychloride are slowly mixed at room temperature with 150 ml. of dimethylaniline and the whole is then heated for 2½ to 3 hours at the boil. The dark-green mixture is cooled and at 20 to 30° C. stirred into water. After several hours the aqueous solution is repeatedly agitated with ether and the dried ethereal phase is evaporated to dryness. The resulting residue is dissolved in hot benzene and the undissolved impurities are filtered off. The filtrate is allowed to cool, whereupon a precipitate forms which is suctioned off and yields 3-chloro-4-phenyl-pyrroline-2,5-dione of the formula

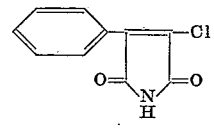

in colorless crystals melting at 157.5–159° C.

EXAMPLE 2

A mixture of 7 g. of 3-chloro-4-phenyl-pyrroline-2,5-dione, 3.4 g. of N-methylpiperazine and 250 ml. of chloroform is heated for 6 hours at the boil. The mixture is then cooled and the crystalline phase is suctioned off; it is the hydrochloride of 3-(4-methylpiperazino)-4-phenyl-pyrroline-2,5-dione of the formula

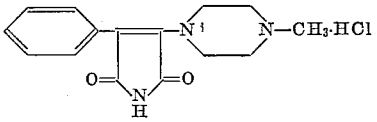

which forms yellow scales melting at 274–276° C. with decomposition.

When the mother liquor is digested with ethyl acetate, it yields another quantity of hydrochloride melting at 272–275° C. with decomposition.

EXAMPLE 3

A mixture of 8 g. of 3-chloro-4-phenyl-pyrroline-2,5-dione, 3.9 g. of triethylamine and 120 ml. of ethyl acetate is heated to the boil, and a solution of 4.4 g. of N-ethyl-piperazine in 30 ml. of ethyl acetate is dropped in. The solution turns gradually red and a crystalline compound settles out. After 4 hours, the mixture is cooled, mixed with water, the insoluble share is suctioned off and the ethyl acetate solution is isolated. The dried organic phase is evaporated. The residue, together with the insoluble share obtained above, is dissolved in hot ethyl acetate and acidified with alcoholic hydrochloric acid solution. On addition of absolute ether the hydrochloride of 3-(4-ethylpiperazino)-4-phenyl-pyrroline-2,5-dione of the formula

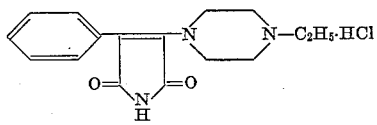

crystallises out; it melts at 273–276° C. with decomposition.

EXAMPLE 4

A mixture of 8 g. of 3-chloro-4-(para-chlorophenyl)-pyrroline-2,5-dione, 3.3 g. of triethylamine and 200 ml. of ethyl acetate is heated to the boil, and a solution of 3.3 g. of N-methylpiperazine in 30 ml. of ethyl actate is dropped in. After 4 hours, the mixture is cooled, mixed with water, the insoluble phase is suctioned off and the ethyl actate solution is isolated. The dried organic phase is evaporated. The residue, together with the above insoluble phase, is dissolved in hot methanol and converted into the corresponding hydrochloride by being mixed with ethanolic hydrochloric acid solution. On addition of absolute ether, the crystalline hydrochloride of 3-(4-methylpiperazino)-4-(para-chlorophenyl)-pyrroline-2,5-dione of formula

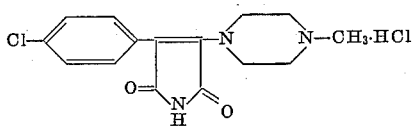

is obtained; it melts at 287–290° C. with decomposition.

The 3-chloro-4-(para-chlorophenyl)-pyrroline-2,5-dione used as starting material can be prepared thus:

A hot solution of sodium methylate (prepared from 4.6 g. of sodium in 100 ml. of methanol) is mixed within a few minutes with a mixture of 30.3 g. of para-chlorobenzylcyanide and 30.7 g. of oxalic acid diethyl ester. The reaction solution turns yellow-brown and the internal temperature drops to 50° C. After stirring the batch for 12 hours at room temperature, it is poured into 300 ml. of water and some neutral impurities are removed by two agitations with ether. The alkaline aqueous solution is then acidified and the precipitated product is again repeatedly extracted with ether. The dried ethereal phase is evaporated to dryness and the crystalline residue is recrystallised from ethyl acetate+petroleum ether. The resulting β-(para-chlorophenyl)-β-cyano-α-oxo-propionic acid methyl ester of the formula

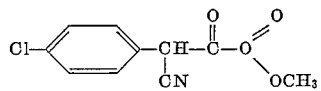

melts at 122–123° C. and can be further worked up as it is.

40 g. of β-(para-chlorophenyl)-β-cyano-α-oxo-propionic acid methyl ester are dissolved with stirring in 200 ml. of alcohol. Hydrogen chloride is injected in this solution for 3½ hours, during which the reaction temperature rises to 40° C. The mixture is stirred for 6 hours at room temperature and then heated for one hour at 50° C. The solution is cooled and the crystalline residue suctioned off. The filtrate is then heated for 5 hours at the boil, evaporated until crystallisation sets in, cooled and suction-filtered. When the second filtrate is evaporated, it yields a third portion of crystalline product. These combined precipitates are recrystallised from ethyl acetate+petroleum ether, to yield crystalline 3-hydroxy-4-(para-chlorophenyl)-pyrroline-2,5-dione of the formula

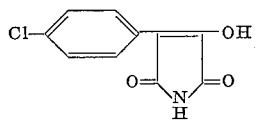

melting at 227–229° C.

78 g. of 3-hydroxy-4-(para-chlorophenyl)-pyrroline-2,5-dione and 300 ml. of phosphorus oxychloride are slowly mixed with 78 ml. of dimethylaniline and then heated for 3 hours at the boil. The mixture is cooled and poured into water, while maintaining the temperature at 25 to 35° C. by adding ice. After several hours, the reaction product is agitated with ethyl acetate. The dried organic phase is evaporated and the residue dissolved in hot benzene, a few resinous impurities are decanted and the remainder cooled, to yield crystalline 3-chloro-4-(para-chlorophenyl)-pyrroline-2,5-dione of the formula

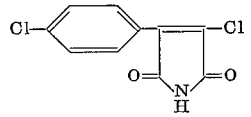

melting at 163–165° C.

EXAMPLE 5

8 g. of 3-chloro-4-phenyl-pyrroline-2,5-dione in 100 ml. of ethyl acetate are heated to the boil and a mixture of 3.9 g. of triethylamine and 5.5 g. of 2-(4-methylpiperazino)-ethylamine is dropped in. After 3 hours, the mixture is twice agitated with water, the dried ethyl acetate solution is evaporated, and the brown red resinous residue (which crystallises on cooling) is recrystallized from ethyl acetate+petroleum ether, to yield crystalline 3-[2-(4-methylpiperazino)-ethylamino]-4-phenyl-pyrroline-2,5-dione of the formula

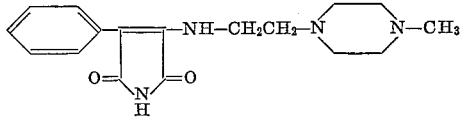

melting at 173–175° C.

EXAMPLE 6

12 g. of 3-chloro-4-(para-chlorophenyl)-pyrroline-2,5-dione in 150 ml. of ethyl acetate are heated to the boil, and a mixture of 7.1 g. of 2-(4-methylpiperazino)-ethylamine and 5.0 g. of triethylamine in 40 ml. of ethyl acetate is dropped in. The mixture turns immediately turbid and dark. It is boiled for two hours, then cooled, diluted with a small amount of chloroform and agitated twice with water. The dried organic phase is evaporated and the resinous residue recrystallized from ethyl acetate+petroleum ether, to yield crystalline 3-[2-(4-methylpiperazino) - ethylamino]-4-(para-chlorophenyl)-pyrroline - 2,5-dione of the formula

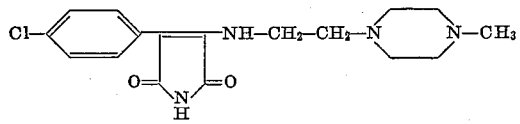

melting at 171–173° C.

EXAMPLE 7

10 g. of 3-chloro-4-phenyl-pyrroline-2,5-dione in 100 ml. of benzene are heated to the boil, and a mixture of 4.9 g. of triethylamine and 5.6 g. of 2-diethylaminoethylamine in 30 ml. of benzene is dropped in. A product crystallises out slowly. After 4 hours the almost completely crystalline mixture is diluted with 100 ml. of chloroform and agitated with dilute sodium bicarbonate solution and then with water. The dried organic phase is evaporated and the residue converted into the corresponding hydrochloride by treatment with alcoholic hydrochloric acid solution. On addition of absolute ether the hydrochloride crystallises out. The resulting hydrochloride of 3-[(2-diethylaminoethyl)-amino]-4-phenyl-pyrroline-2,5-dione of the formula

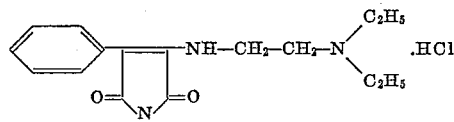

melts at 179–181° C.

EXAMPLE 8

10 g. of 3-chloro-4-phenyl-pyrroline-2,5-dione in 150 ml. of benzene are heated to the boil, and a mixture of 4.9 g. of triethylamine and 7 g. of n-butyl-(2-diethylaminoethyl)-amine in 30 ml. of benzene is dropped in. After half an hour the mixture is twice agitated with water, the dried ethyl acetate solution is evaporated, and the resulting residue is converted into the corresponding hydrochloride by treatment with alcoholic hydrochloric acid in absolute alcohol. On addition of absolute ether, the hydrochloride crystallises out. The resulting hydrochloride of 3-[n-butyl-(2-diethylaminoethyl)-amino]-4-phenyl-pyrroline-2,5-dione of the formula

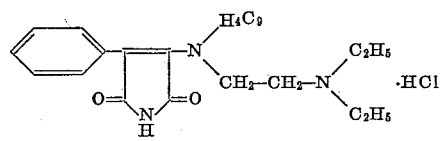

can be recrystallized from alcohol+absolute ether and melts at 228–231° C.

EXAMPLE 9

10 g. of 3-chloro-4-phenyl-pyrroline-2,5-dione in 150 ml. of benzene are heated to the boil, and a mixture of 9.7 g. of benzyl-(2-diethylaminoethyl)-amine and 4.9 g. of triethylamine in 30 ml. of benzene is dropped in. After half an hour the mixture is twice agitated with water, the dried ethyl acetate solution is evaporated and the resulting residue is converted into the corresponding hydrochloride with alcoholic hydrochloric acid in absolute alcohol. On addition of ether the hydrochloride crystallises out. The resulting hydrochloride of 3-[benzyl-(2-diethylaminoethyl)-amino]-4-phenyl-pyrroline-2,5-dione of the formula

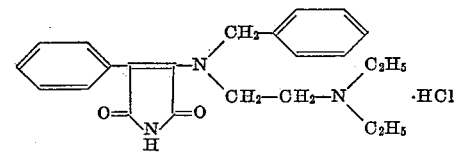

can be recrystallized from absolute alcohol+absolute ether and melts at 152–154° C.

EXAMPLE 10

10 g. of 3-chloro-4-phenyl-pyrroline-2,5-dione in 100 ml. of benzene are heated to the boil, and a mixture of 8.6 g. of benzyl-(2-dimethylaminoethyl)-amine and 4.9 g. of triethylamine in 30 ml. of benzene is dropped in. A product crystallises out slowly. After 4 hours the almost completely crystallized mixture is diluted with 100 ml. of chloroform and agitated with dilute sodium bicarbonate solution and then with water. The dried organic phase is evaporated and the residue converted into the corresponding hydrochloride with alcoholic hydrochloric acid. The hydrochloride crystallises out on addition of absolute ether. The resulting hydrochloride of 3-[benzyl-(2-dimethylaminoethyl)amino]-4-phenyl-pyrroline-2,5 - dione of the formula

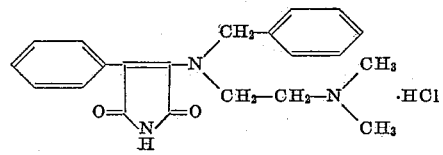

is recrystallised from alcohol+ether and melts at 226–228° C.

EXAMPLE 11

8 g. of 3-chloro-4-(meta-methoxyphenyl)-pyrroline-2,5-dione in 100 ml. of benzene are heated to the boil, and a mixture of 3.4 g. of triethylamine and benzyl-(2-dimethylaminoethyl)-amine in 30 ml. of benzene is dropped in. The batch is boiled for 2 hours, then cooled, the reaction product is diluted with a small amount of chloroform and agitated twice with water. The dried organic phase is evaporated and the residue converted into the corresponding hydrochloride by treatment with alcoholic acid. The hydrochloride crystallises out on addition of absolute ether. The resulting hydrochloride of 3-[benzyl - (2 - dimethylaminoethyl)-amino]-4-(meta-methoxyphenyl)-pyrroline-2,5-dione of the formula

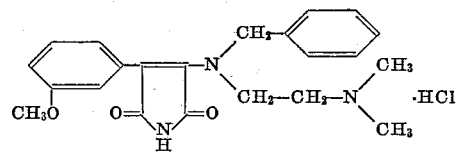

melts at 215–217° C. after recrystallisation from ether +90% alcohol.

The 3-chloro-4-(meta-methoxyphenyl)-pyrrolidine-2,5-dione used as starting material can be prepared thus:

A hot solution of 4.6 g. of sodium in 100 ml. of methanol is mixed within a few minutes with a mixture of 30.7 g. of oxalic acid diethyl ester and 29.4 g. of meta-methoxybenzylcyanide. The batch turns yellow and turbid and the temperature drops to 50° C. After 12 hours' stirring at room temperature the mixture is poured into 300 ml. of water, and the aqueous alkaline solution is acidified, whereupon at first an oil settles out which on cooling crystallises right through. The precipitated product is repeatedly agitated with ether. The dried organic phase is evaporated, and the crystalline residue is recrystallized from ether+petroleum ether. The resulting β - (meta - methoxyphenyl)-β-cyano-α-oxopropionic acid methyl ester of the formula

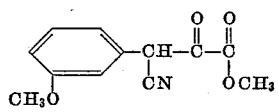

melts at 98–99° C.

40 g. of β-(meta-methoxyphenyl)-β-cyano-α-oxopropionic acid methyl ester are dissolved with stirring in 200 ml. of alcohol. Hydrogen chloride is injected into this solution for 3½ hours, with the reaction temperature rising to 40° C. The mixture is stirred for 6 hours at room temperature and then heated for one hour at 50° C. The solution is cooled and the crystalline precipitate suctioned off. The filtrate is then heated for another 5 hours at the boil, concentrated until crystallisation sets in, cooled and suctioned. Evaporation of the second filtrate yields a third amount of crystalline product. These combined precipitates are recrystallized from ethyl acetate+petroleum ether, to yield crystalline 3-hydroxy-4-(meta-methoxyphenyl)-pyrroline-2,5-dione of the formula

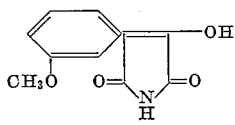

melting at 207–209° C.

59.4 g. of 3-hydroxy-4-(meta-methoxyphenyl)-pyrroline-2,5-dione and 240 ml. of phosphorus oxychloride are slowly mixed with 60 ml. of dimethylaniline and then heated for 3 hours at the boil. The cooled mixture is poured into water, while maintaining the temperature at 25 to 35° C. by adding ice. After several hours the reaction product is agitated with ethyl acetate. The dried organic phase is evaporated and the residue is dissolved in hot benzene, some resinous impurities are decanted, and the remainder cooled, to yield crystalline 3-chloro-4-(meta-methoxyphenyl)-pyrroline-2,5-dione of the formula

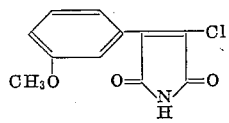

melting at 122–124° C.

EXAMPLE 12

8 g. of 3-chloro-4-(para-chlorophenyl)-pyrroline-2,5-dione in 100 ml. of benzene are heated to the boil, and a mixture of 5.9 g. of benzyl-(2-dimethylaminoethyl)-amine and 3.4 g. of triethylamine in 30 ml. of benzene is dropped in. The mixture turns gradually dark and after 10 minutes a product begins to crystallise out. The batch is kept for several hours, and the reaction solution is then mixed with water and acidified. The crystalline hydrochloride formed is suctioned off. The filtrate is freed from the benzene layer which is washed with dilute sodium carbonate solution, dried over sodium sulfate and evaporated. The resulting resinous residue is converted into the corresponding hydrochloride by treatment with alcoholic hydrochloric acid solution in absolute alcohol. On addition of absolute ether the hydrochloride settles out; it is recrystallized, together with the suction filter cake obtained above, from ether+90% alcohol, to yield the hydrochloride of 3 - [benzyl - (2-dimethylaminoethyl)-amino]-4-(para-chlorophenyl)-pyrroline-2,5-dione of the formula

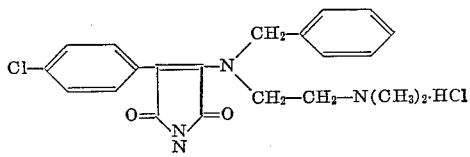

melting at 240–243° C.

EXAMPLE 13

11.1 g. of 1-methyl-3-chloro-4-phenyl-pyrroline-2,5-dione are heated in 150 ml. of absolute benzene to the boil and treated dropwise with 8.85 g. of benzyl-(2-dimethylaminoethyl)-amine and 5.1 g. of triethylamine in 40 ml. of benzene. The batch is boiled under reflux for two hours with stirring. After cooling, the reaction mixture is washed with 200 ml. of saturated sodium carbonate solution and with water, the benzene solution is dried over magnesium sulfate and evaporated. The oily residue is dissolved in 2 N hydrochloric acid, washed with ethyl acetate; the aqueous acidic solution is treated with animal carbon, filtered, rendered alkaline with ammonia and extracted with ethyl acetate.

The ethyl acetate extracts are dried over magnesium sulfate, filtered and evaporated, and the oily residue is reacted in absolute alcohol with an alcoholic hydrochloric acid solution to form the corresponding hydrochloride. By the addition of absolute ether the hydrochloride is precipitated. The latter is recrystallized from a mixture of alcohol and ethter to yield the hydrochloride of 1-methyl - 3 - [benzyl-(2-dimethylaminoethyl)-amino]-4-phenyl-pyrroline-2,5-dione of the formula

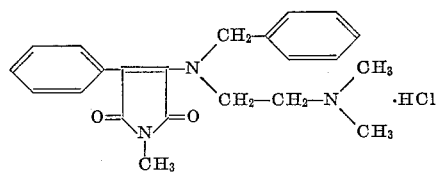

melting at 191–193° C.

The 1 - methyl-3-chloro-4-phenyl-pyrroline-2,5-dione used as starting material may be prepared as follows: 100 g. of 3-chloro-4-phenyl-pyrroline-2,5-dione are added to a solution of 20 g. of sodium hydroxide in 1000 ml. of water. After being stirred for 30 minutes a clear solution is formed, and after 4 hours the reaction solution is acidified with 20% hydrochloric acid until a pH value of 1–2 is attained. The batch is extracted several times with ether, dried over magnesium sulfate, filtered and evaporated in vacuo. The residue is recrystallized from a mixture of ethyl acetate and petroleum ether and yields 2-chloro-3-phenylmaleic acid anhydride of the formula

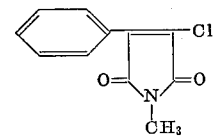

in the form of colorless crystals melting at 84–85° C.

20.8 g. of 2-chloro-3-phenyl-maleic acid anhydride are added to a solution of 3.1 g. of methylamine in 50 ml. of glacial acetic acid, and the batch is boiled under reflux for 20 minutes and evaporated in vacuo. Water is added to the residue, and the reaction mixture is extracted with methylene chloride and washed with sodium bicarbonate solution. The methylene chloride residue is recrystallized from petroleum ether to yield 1-methyl-3-chloro-4-phenyl-pyrroline-2,5-dione of the formula melting at 74–79° C.

*Example 14*

In an analogous manner to that described in Examples 1 to 12 there may be prepared 3-[(p-chlorobenzyl) (γ - morpholinopropyl) - amino]-4-(p-trifluoromethylphenyl)pyrroline - 2,5-dione; 3-[(m-methoxybenzyl)-(β-thiamorpholinoethyl) - amino]-4-(o-tolyl)-pyrroline-2,5-dione; 3 - [(o-tolyl)-(N-methyl-pyrrolidinyl-(2)-methyl)-amino] - 4 - (p-chlorophenyl)-pyrrolidine-2,5-dione; 3-[(p - trifluoromethylphenethyl) - (N-methyl-piperidinyl-(2) - methyl) - amino]-4-phenyl-pyrroline-2,5-dione; 3-[N' - (β - hydroxyethyl)-piperazino]-4-phenyl-pyrroline-2,5 - dione and 3-[benzyl-(β-allyl-methylaminoethyl)-amino]-4-phenyl-pyrroline-2,5-dione.

What is claimed is:
1. A member selected from the group consisting of a compound of the formula

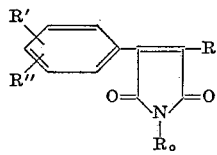

in which R' and R" each stands for a member selected from the group consisting of hydrogen, lower alkyl, lower alkoxy, halogen and trifluoromethyl, $R_o$ stands for a member selected from the group consisting of hydrogen and lower alkyl, and R stands for a member selected from the group consisting of piperazino, 4-lower alkyl-piperazino, 4-lower alkenyl-piperazino, 4-(hydroxy-lower alkyl)-piperazino and the groups of the formulae

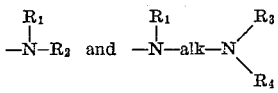

in which $R_1$ stands for a member selected from the group consisting of hydrogen, lower alkyl, phenyl-lower alkyl, lower alkyl-phenyl-lower-alkyl, lower alkoxy-phenyl-lower alkyl, halogen-phenyl-lower alkyl and trifluoromethyl-phenyl-lower alkyl, $R_2$ stands for a member selected from the group consisting of N-(lower alkyl)-pyrrolidinyl-lower alkyl and N-(lower alkyl)-piperidinyl-lower alkyl, alk stands for lower alkylene and $R_3$ and $R_4$ each stands for a member selected from the group consisting of hydrogen, lower alkyl, lower alkenyl, and, when taken together, stand for a member selected from the group consisting of alkylene having 4 to 8 carbon atoms, morpholino, piperazino, 3-oxa-pentylene-(1,6)-amino, 3-aza-pentylene-(1,6)-amino, 4-(lower alkyl)piperazino and 4-(hydroxy-lower alkyl)-piperazino, and an acid addition salt thereof.

2. A member selected from the group consisting of a compound of the formula

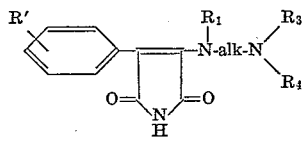

in which R' stands for a member selected from the group consisting of hydrogen, lower alkoxy and halogen, $R_1$ stands for a member selected from the group consisting of hydrogen, lower alkyl and phenyl-lower alkyl, alk for lower alkylene and $R_3$ and $R_4$ each stands for lower alkyl, and an acid addition salt thereof.

3. A member selected from the group consisting of a compound of the formula

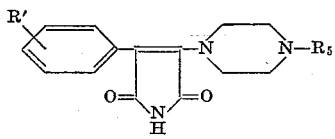

in which R' stands for a member selected from the group consisting of hydrogen and halogen and $R_5$ for lower alkyl, and an acid addition salt thereof.

4. A member selected from the group consisting of a compound of the formula

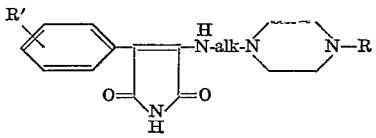

in which R stands for lower alkyl, R' for a member selected from the group consisting of hydrogen and halogen and alk for lower alkylene, and an acid addition salt thereof.

5. 3 - (4-methyl-piperazino)-4-phenyl-pyrroline-2,5-dione.
6. 3 - (4 - ethyl-piperazino)-4-phenyl-pyrroline-2,5-dione.
7. 3 - (4 - methyl-piperazino)-4-(para-chlorophenyl)-pyrroline-2,5-dione.
8. 3 - [2 - (4-methyl-piperazino)-ethylamino]-4-phenyl-pyrroline-2,5-dione.
9. 3 - [2 - (4-methyl-piperazino)-ethylamino]-4-(para-chlorophenyl)-pyrroline-2,5-dione.
10. 3 - [(2 - diethylaminoethyl)-amino]-4-phenyl-pyrroline-2,5-dione.
11. 3 - [n - butyl-(2-diethylaminoethyl)-amino]-4-phenyl-pyrroline-2,5-dione.
12. 3 - [benzyl - 2-diethylaminoethyl)-amino]-4-phenyl-pyrroline-2,5-dione.
13. 3 - [benzyl - (2-dimethylaminoethyl)-amino]-4-phenyl-pyrroline-2,5-dione.
14. 3 - [benzyl - (2-dimethylaminoethyl)-amino]-4-(meta-methoxyphenyl)-pyrroline-2,5-dione.
15. 1 - methyl - 3-[benzyl-(2-dimethylaminoethyl)-amino]-4-phenyl-pyrroline-2,5-dione.
16. A compound of the formula

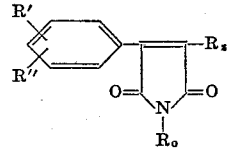

in which R' and R" each stands for a member selected from the group consisting of hydrogen, lower alkyl, lower alkoxy, halogen and trifluoromethyl, $R_o$ stands for a member selected from the group consisting of hydrogen and lower alkyl, and $R_z$ for halogen.

17. 4 - (para-chlorophenyl)-3-chloro-pyrroline-2,5-dione.
18. 4 - (meta-methoxyphenyl)-3-chloro-pyrroline-2,5-dione.
19. 4 - phenyl-3-chloro-pyrroline-2,5-dione.
20. 1 - methyl-4-phenyl-3-chloro-pyrroline-2,5-dione.
21. A compound of the formula

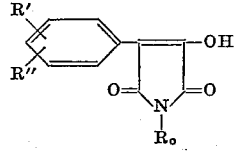

in which R' stands for a member selected from the group consisting of lower alkoxy, halogen and trifluoromethyl, R" stands for a member selected from the group consisting of hydrogen, lower alkyl, lower alkoxy, halogen and trifluoromethyl, and $R_o$ for a member selected from the group consisting of hydrogen and lower alkyl.

22. 4 - (para-chlorophenyl)-3-hydroxy-pyrroline-2,5- dione.
23. 4 - (meta-methoxyphenyl)-3-hydroxy-pyrroline-2,5-dione.

No references cited.

HENRY R. JILES, *Primary Examiner.*